United States Patent
You et al.

(10) Patent No.: US 9,237,496 B2
(45) Date of Patent: Jan. 12, 2016

(54) METHOD AND APPARATUS FOR TRANSMITTING CHANNEL SWITCHING INFORMATION

(71) Applicant: LG Electronics Inc., Seoul (KR)

(72) Inventors: Hyang Sun You, Gyeonggi-do (KR); Yong Ho Seok, Gyeonggi-do (KR); Jong Hyun Park, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 14 days.

(21) Appl. No.: 14/360,871

(22) PCT Filed: Dec. 5, 2012

(86) PCT No.: PCT/KR2012/010463
§ 371 (c)(1),
(2) Date: May 27, 2014

(87) PCT Pub. No.: WO2013/085269
PCT Pub. Date: Jun. 13, 2013

(65) Prior Publication Data
US 2014/0321415 A1    Oct. 30, 2014

Related U.S. Application Data

(60) Provisional application No. 61/567,116, filed on Dec. 5, 2011.

(51) Int. Cl.
*H04L 12/26* (2006.01)
*H04W 4/00* (2009.01)
(Continued)

(52) U.S. Cl.
CPC .......... *H04W 36/06* (2013.01); *H04W 36/0055* (2013.01); *H04W 84/12* (2013.01)

(58) Field of Classification Search
CPC ..... H04W 8/005; H04W 24/00; H04W 36/00; H04W 36/0055; H04W 36/0061; H04W 36/0072; H04W 36/0083; H04W 36/0088; H04W 36/06; H04W 36/08; H04W 36/30; H04W 40/00; H04W 40/02; H04W 40/24; H04W 40/246; H04W 40/248; H04W 48/08; H04W 48/12; H04W 48/14; H04W 48/16; H04W 48/18; H04W 48/20; H04W 52/0216; H04W 56/00; H04W 64/00; H04W 72/02; H04W 72/0406; H04W 72/042; H04W 72/085; H04W 72/1231; H04W 74/002; H04W 76/02; H04L 12/2602; H04L 41/12; H04L 45/02; H04L 45/04; H04L 45/26; H04L 45/48; H04L 45/60; H04L 47/14
USPC ......... 370/250–252, 310–350, 400–401, 431, 370/437, 464–465; 455/431–464; 709/217–229, 246–250
See application file for complete search history.

(56) References Cited

U.S. PATENT DOCUMENTS

| | | | | |
|---|---|---|---|---|
| 8,023,468 | B2 * | 9/2011 | Liu | H04W 48/12 370/331 |
| 8,208,415 | B2 * | 6/2012 | Kim | H04W 72/06 370/310 |

(Continued)

FOREIGN PATENT DOCUMENTS

| | | |
|---|---|---|
| KR | 1020040104796 A | 12/2004 |
| KR | 1020080107395 A | 12/2008 |

*Primary Examiner* — Tri H Phan
(74) *Attorney, Agent, or Firm* — Dentons US LLP

(57) ABSTRACT

Disclosed are a method and an apparatus for transmitting a channel switching information. A method for transmitting switching information of an operating channel may comprises the step of: receiving a candidate channel frame including channel switch candidate information through the operating channel, and preferentially scanning a candidate operation channel induced based on the channel switch candidate information if the operating channel is changed, wherein the candidate operation channel may be a channel having a possibility of being preferentially selected when the operating channel is changed to another channel. As a result, when an access point (AP) shifts the operating channel, the shifted channel can be quickly scanned and associated with AP.

12 Claims, 11 Drawing Sheets

(51) Int. Cl.
*H04L 12/28* (2006.01)
*H04J 3/06* (2006.01)
*H04W 36/06* (2009.01)
*H04W 36/00* (2009.01)
*H04W 84/12* (2009.01)

(56) References Cited

U.S. PATENT DOCUMENTS

| | | | |
|---|---|---|---|
| 8,254,322 B2* | 8/2012 | Shan | H04W 72/00 370/329 |
| 8,537,730 B2* | 9/2013 | Liu | H04B 10/0771 370/310 |
| 2003/0125047 A1* | 7/2003 | Chen | H04W 72/085 455/456.1 |
| 2006/0153133 A1* | 7/2006 | Zhong | H04W 36/0061 370/331 |
| 2011/0176580 A1 | 7/2011 | Zhai et al. | |
| 2012/0163314 A1* | 6/2012 | Lee | H04W 74/02 370/329 |
| 2015/0063290 A1* | 3/2015 | Wang | H04W 16/30 370/329 |

\* cited by examiner

METHOD AND APPARATUS FOR TRANSMITTING CHANNEL SWITCHING INFORMATION

This application is a 35 U.S.C. §371 National Stage entry of International Application No. PCT/KR2012/010463, filed Dec. 5, 2012, which claims the benefit of priority of U.S. Provisional application 61/567,116 filed on Dec. 5, 2011, both of which are incorporated by reference in their entirety herein.

BACKGROUND OF THE INVENTION

1. Field of the Invention

The present invention relates to wireless communication and, more particularly, to a method and apparatus for transmitting the channel switching information.

2. Related Art

Recently, Machine-to-Machine (M2M) system is spotlighted as the next generation communication technology, and new standard for it has been in the course of establishment in order to technically support it in IEEE 802.11 WLAN. The M2M system means the network in which machinery, as a main agent of communication, not human exchanges information. The components of M2M are widely ranged from sensors to detect temperature and humidity, electric home appliance such as camera, TV and etc. to large-scale machines such as machinery tools and automobiles. Recently, with emerging various communication services such as smart grid, e-Health and ubiquitous, M2M technology is widely used in order to technically support the communication services. The characteristics of M2M system are as follows.

1) Large number of station: As for M2M, large number of station is assumed that is different from the existing network. That is because sensors installed on house, company, and etc as well as machines of personal belongings should be considered. Accordingly, considerably large number of station may be connected to a single AP.

2) Low traffic load per each station: Because M2M terminal has traffic pattern which is collecting and reporting information around, it is not necessary to communicate data frequently but also the amount of data is not considerable.

3) Uplink centric: M2M has structure that reports the data using uplink after receiving commands and executing procedures. Since main data is commonly forwarded using uplink, consequently, uplink is mainly used in M2M.

4) Long durability of Station: M2M terminals are operated by mainly battery, and user frequently recharges the battery in many cases. Accordingly, long durability is demanded by minimizing consumption of the battery.

5) Automatic recovery function: M2M terminals are not operable by users in certain situation. Accordingly, automatic recovery function is necessary.

SUMMARY OF THE INVENTION

The present invention provides a method for transmitting the channel switching information.

The present invention also provides an apparatus for transmitting the channel switching information.

In an aspect of the present invention, a method for transmitting switching information of an operating channel may comprise receiving a candidate channel frame including channel switch candidate information through the operating channel, and preferentially scanning a candidate operation channel induced based on the channel switch candidate information if the operating channel is changed, wherein the candidate operation channel may be a channel having a possibility of being preferentially selected if the operating channel is changed to another channel. The channel switch candidate information may further include candidate operation channel list version information for indicating the candidate channel set that includes at least one of the candidate operation channels, and candidate timeout information that corresponds to information of time when the candidate operation channel included in the candidate channel set at least is used as a valid candidate operation channel. The method for transmitting switching information may further comprise transmitting a candidate channel request frame including channel switch candidate request information for acquiring information of the candidate operation channel, wherein the channel switch candidate request information may include sleep interval information and candidate operation channel list version information which is recently received. The candidate channel request frame may be transmitted in wake up mode by considering the sleep interval information.

In another aspect of the present invention, a station that receives switching information of an operating channel may comprise a process and a transceiver, wherein the transceiver may be implemented to receive a candidate channel frame including channel switch candidate information through the operating channel, wherein the process may be implemented to preferentially scan a candidate operation channel induced based on the channel switch candidate information if the operating channel is changed based on the candidate channel frame received, and wherein the candidate operation channel may be a channel having a possibility of being preferentially selected if the operating channel is changed to other channel. The channel switch candidate information may further include candidate operation channel list version information for indicating the candidate channel set that includes at least one of the candidate operation channels, and candidate timeout information that corresponds to information of time when the candidate operation channel included in the candidate channel set at least is used as a valid candidate operation channel. The process may be implemented to generate a candidate channel request frame including channel switch candidate request information for acquiring information of the candidate operation channel, wherein the transceiver may transmit the candidate channel request frame, and wherein the channel switch candidate request information may include sleep interval information and candidate operation channel list version information which is recently received. The candidate channel request frame may be transmitted in wake up mode by considering the sleep interval information.

ADVANTAGEOUS EFFECTS

According to the method and apparatus for transmitting the channel switching information according to an embodiment of the present invention as described above, if a candidate channel frame including channel switch candidate information is received through the operating channel information and the operating channel is changed, it is able to preferentially scan the candidate operation channel induced based on the channel switch candidate information. Accordingly, it is able to be associated fast by fast scan the moved operating channel when an access point (AP) moves through the operating channel.

DESCRIPTION OF EXEMPLARY EMBODIMENTS

Figure 1:
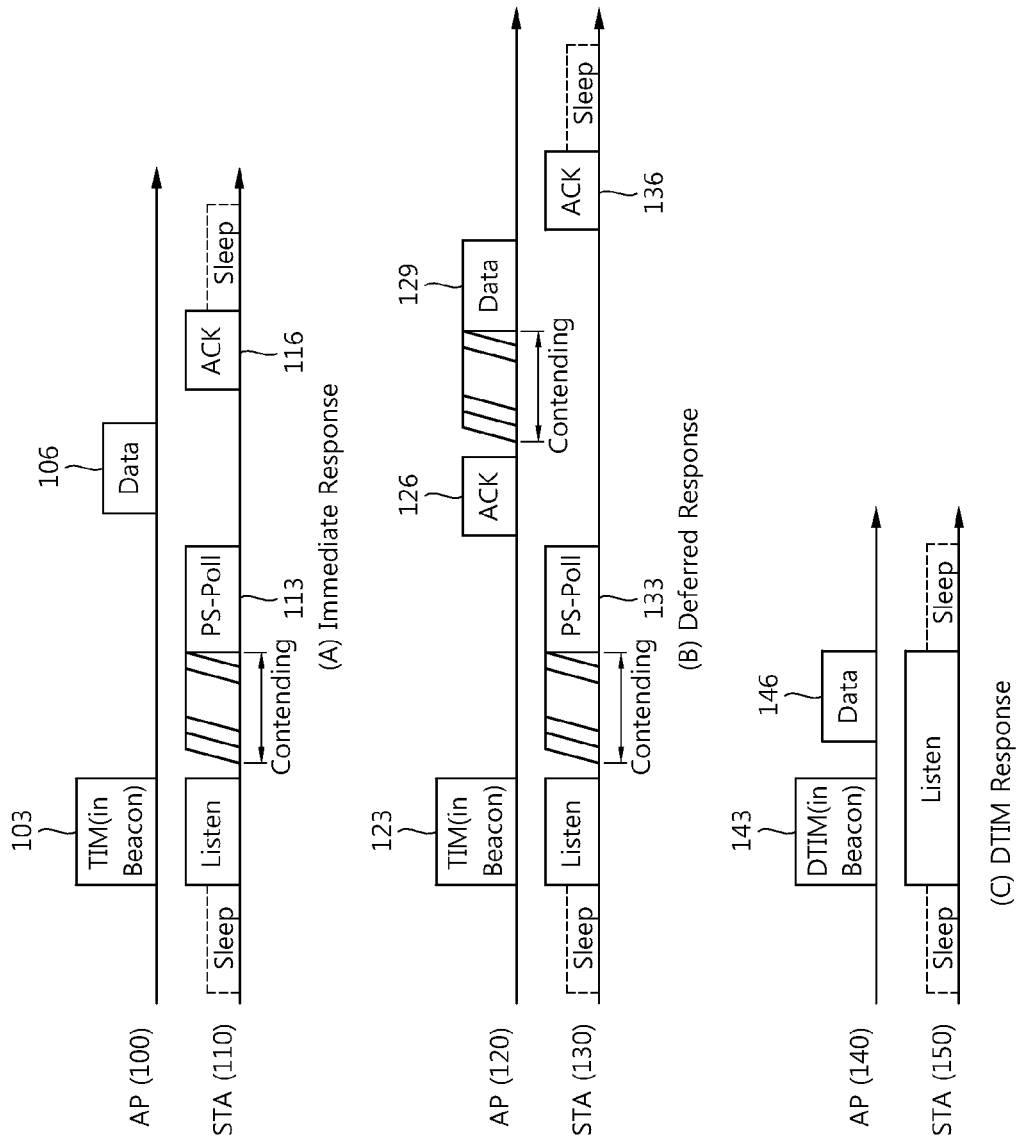
FIG. 1 is a schematic view illustrating the power saving mechanism which is used in IEEE 802.11.

FIG. 1 is a schematic view illustrating the power saving mechanism which is used in IEEE 802.11.

In IEEE 802.11 standard, the power saving mechanism is provided in order to lengthen the life span of the wireless local area network (WLAN) station (STA). For power saving, the STA may operate in two modes of an active mode and a sleep mode. The active mode is referred to the state that the normal operations such as the transmission or reception of a frame, the channel scanning, or the like are possible. On the other hand, the sleep mode is referred to the state that the transmission or reception of the frame is not possible since the power consumption is extremely decreased, neither is the channel scanning.

In the power saving mechanism, the STA is capable to prevent unnecessary power consumption using the way to decrease the power consumption operating in sleep mode normally but switching to the active mode if it is necessary.

Since the power consumption can be more decreased by more operating in the sleep mode as long as possible, the life span of the STA can be increased. However, since it is not possible to perform the transmission and reception of the frame in the sleep mode, it is not available for the STA to operate in the sleep mode continuously no matter how long it can be workable. In case that there is a frame to be forwarded in the sleep mode, it is available for the STA to switch into the active mode for transmitting and receiving the frame, a significant problem does not occur.

However, in case that an access point (AP) has a frame to be forwarded to the STA while the STA is in the sleep mode, the STA is not able to receive it nor able to identify whether there is a frame to be forwarded. Accordingly, the STA should be switched to the active mode intermittently and operated in the reception mode in order to identify whether there is a frame to receive and if there is one, it should be ready to receive it. And the AP should notify whether there is a frame to be forwarded to the STA on time when the STA is operated in the active mode.

FIG. 1 (A) is a conceptual diagram illustrating the method that the STA 110 receives the TIM 103 which is included in a beacon frame and receives data.

In order for the STA 110 to identify that there is a frame to receive, the STA 110 may be periodically switched to the active mode from the sleep mode and receive the beacon frame 103 from the access point (AP) 100. The beacon frame 103 may include a traffic indication map (TIM) and a delivery traffic indication map (DTIM). The TIM is the information to indicate that there exist the data 106 to be forwarded to a specific STA, and may be transmitted by unicast. The DTIM is the information to indicate that there exist the data to be forwarded to all STAs, and may be transmitted to the STA within the basic service set (BSS) by multicast or broadcast.

The STA 110 that receives the TIM through the beacon frame 103 accesses the AP 100 by contending based on the carrier sense multiple access/collision avoidance (CSMA/CA) mechanism, and request the transmission of the data 106 which is buffered by transmitting a PS-Poll frame 113 to the AP 100. In case that the buffered data is available to be transmitted to the STA 110 after a short inter frame space (SIFS) time from the AP 100, the buffered data is transmitted to the STA 110 from the AP 100 immediately. Later, the STA 110 transmits the ACK 116 of the data 106 received to the AP 100. The case that the STA 110 receives the buffered data 106 immediately in response to the PS-poll frame 113, which is referred to the case of receiving an immediate response.

FIG. 1 (B) is a schematic view illustrating the method of receiving the TIM included in the beacon frame 123 and receiving the data 129.

FIG. 1 (B) represents the case that the AP 120 is unable to transmit the data immediately to the STA 130, which is different from the case of the immediate response represented in FIG. 1 (A).

In case that the AP 120 is not able to transmit the data to the STA 130 since the data which is buffered for the SIFS interval in response to the PS-poll frame 133 is not prepared, the AP 120 transmits the ACK frame 126 to the STA 130 first to indicate the that the transmission of the buffered data 129 is deferred.

The AP 120 may transmit the buffered frame 129 to the STA 130 in a predetermined time, and the STA 130 may be switched to the sleep mode again after receiving the buffered frame and transmitting the ACK frame 126 to the AP 120.

FIG. 1 (C) is a conceptual diagram illustrating the case that the beacon frame transmits the DTIM not the TIM.

Referring to FIG. 1 (C), the DTIM 143 is the information for indicating whether there exists a frame to be transmitted by using the broadcast or the multicast to the multiple STAs. In case that the STA 150 receives the beacon frame 143 including the DTIM, the STA 150 may immediately receives the data frame 146 which is transmitted from the AP 140, not transmitting the frame to the AP 140 separately. The STA 150 is allocated an Association ID (AID) with being associated with the AP 140. The AID only is used in a BSS and may have the value of 1 to 2007. Maximum 16383 is available for the AID since 14 bits are allocated for the AID, but the values of 2008 to 16383 are reserved.

Figure 2:
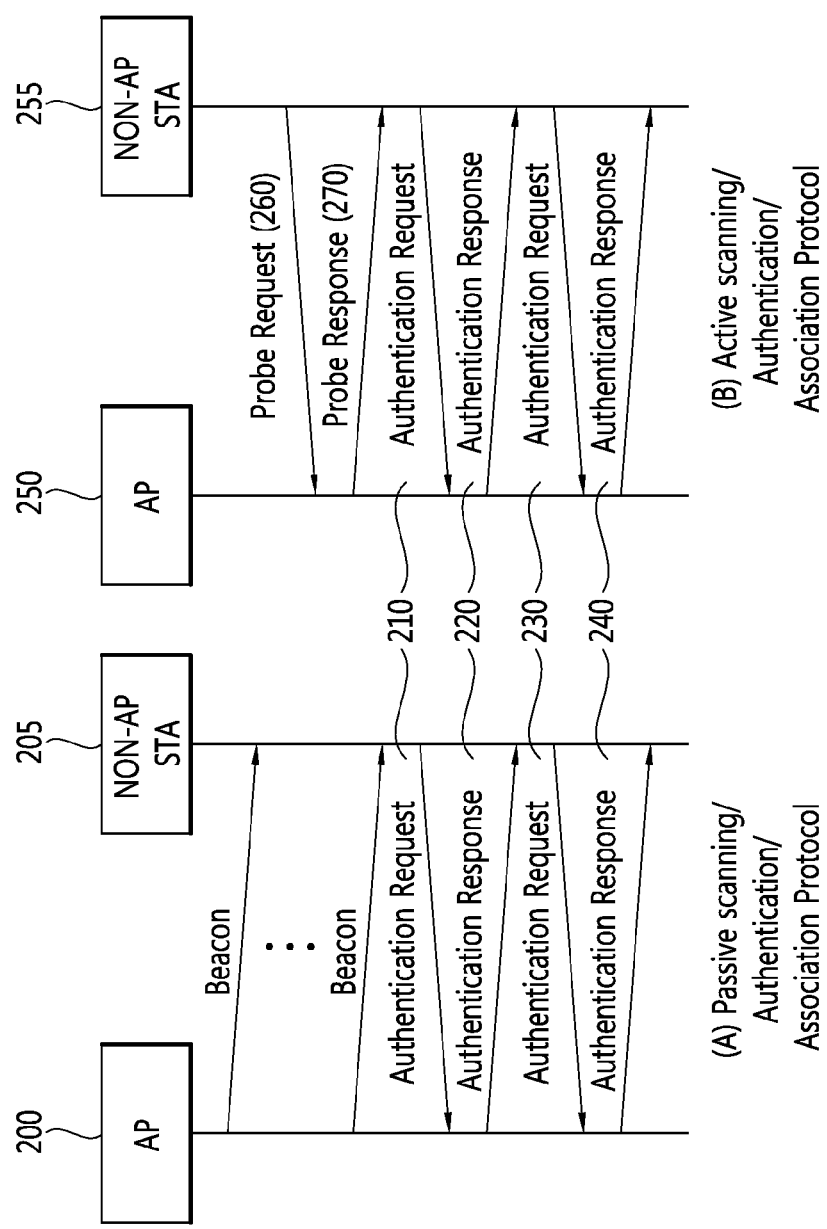
FIG. 2 is a schematic view illustrating the process of authentication and association after scanning the AP and the STA according to an embodiment of the present invention.

FIG. 2 is a schematic view illustrating the process of authentication and association after scanning the AP and the STA according to an embodiment of the present invention.

Referring to FIG. 2, after performing the passive/active scanning, the authentication and the association may be performed with an AP among the APs scanned.

The process of the authentication and the association may be performed through 2-way handshaking. FIG. 2 (A) is a conceptual diagram illustrating the process of the authentication and the association after the passive scanning, and FIG. 2 (B) is a conceptual diagram illustrating the process of the authentication and the association after the active scanning.

The process of the authentication and the association may be identically performed by exchanging the authentication request frame 210/the authentication response frame 220 and the association request frame 230/the association response frame 340 between the AP 300, 350 and the non-AP STA 205, 255 no matter which method either the active scanning or the passive scanning may be used.

The process of authentication may be performed in the way that the non-AP STA 205 and 255 transmit the authentication request frame 210 to the AP 200 and 250. In response to the authentication request frame 210, the authentication request frame 210 may be transmitted to the non-AP STA 205 and 255 from the AP 200 and 250. The authentication frame format is disclosed in section 8.3.3.11 of IEEE 802.11.

The process of association may be performed in the way that the non-AP STA 205 and 255 transmit the association request frame 230 to the AP 200 and 205. In response to the association request frame 230, the association response frame 240 may be transmitted to the non-AP STA 200 and 250 from the AP 205 and 255. The association request frame 230 includes the information of the capability of the non-AP STA 205 and 255. The AP 200 and 250 may determine whether the support to the non-AP STA 205 and 255 is available based on the capability information of the non-AP STA 205 and 255. If the support is available, AP 200 and 250 may transmit the association response frame 240 including the information whether to accept the association request frame 230 and the reason to accept, and the capability information that the AP 200 and 250 is able to support to the non-AP STA 205 and 255. The association frame format is disclosed in section 8.3.3.6 of IEEE 802.11.

In case that it is performed to the step of the association, afterward the normal transmission and reception of the data is performed. In case that the association is not performed, anther try (association) is performed considering the reason why it is not performed or the association to another AP may be performed.

In the state of the AP being associated with the STAs, the operating channel may be changed, and in this case, the AP notifies to the STAs that the operating channel has been changed by transmitting the channel switch announcement element. The channel switch announcement element is transmitted through a beacon frame, a probe response frame or a channel switch announcement frame.

Figure 3:
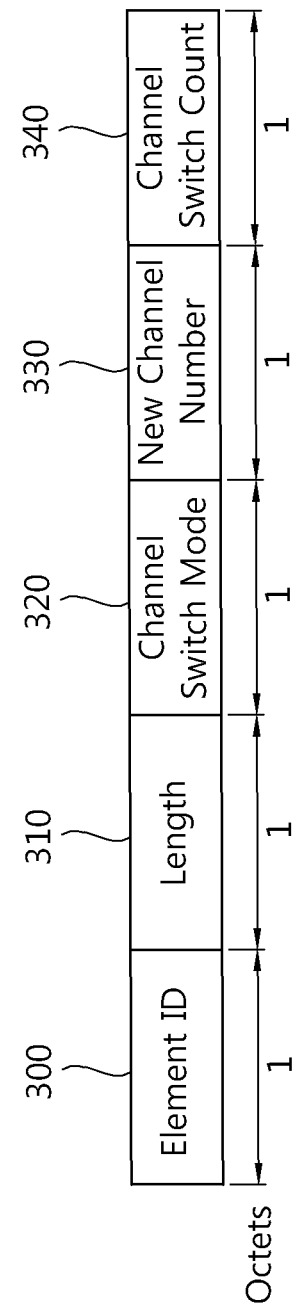
FIG. 3 is a conceptual diagram illustrating the channel switch announcement element according to an embodiment of the present invention.

FIG. 3 is a conceptual diagram illustrating the channel switch announcement element according to an embodiment of the present invention.

The AP determines to switch the operating channel in the infrastructure basic service set (BSS). The AP may notify that the AP itself moves to a new channel to the STAs associated and keeps the association with the STAs by using the channel announcement element included in the beacon frame, the probe response frame, the channel switch announcement frame by the channel switching time scheduled.

The AP may request to stop the transmission to the STA that exists in the BSS by setting to 1 for the channel switch mode field 320 which is included in the channel switch announcement element. The channel switching is scheduled to receive at least one or more channel switch announcement elements before all of the STAs (including the STA of the power save mode) that exist in the BSS perform the channel switching.

In case that the AP is in the state of idle for the point coordination function (PCF) interframe space (PIFS), the AP may transmit the channel switch announcement frame to the BSS without the backoff.

Referring to FIG. 3, the channel switch announcement elements may include an element ID 300, a length 310, a channel switch mode 320, a new channel number 330 and a channel switch count 340.

The element ID 300 may be used for indicating what the information element is.

The length 310 may be used for indicating the length of the information field, the channel switch mode 320, the new channel number 330 and the channel switch count 340.

Hereinafter, the element ID 300 which is included in the information element described in the present invention may be interpreted as the field including the identifier representing the information element, and the length 310 may be interpreted as the field including the length information for the information.

The channel switch mode 320 may include the limited information for the transmission until the channel switching is performed. The AP included in the BSS or the STA included in the IBSS may set the channel switch mode to be 0 or 1.

The new channel number 330 may include the channel number to which the STA is moved.

The channel switch count 340 may include the information of the numbers of the target beacon transmission time (TBTT) until the STA that forwards the channel switch announcement element has switched to a new channel.

The AP may notify the information of which channel is the operating channel changed to after several units of the target beacon transmission time (TBTT) has passed by transmitting the frame including the channel switch announcement element.

However, the STA having the long sleep interval as long as 10 minutes may not receive the channel switch announcement element for the sleep interval. Since the STA that does not receive the channel switch announcement element which is transmitted by the AP does not know the changed operating channel of the AP, the STA tries to receive the beacon frame in the previous operating channel.

The present invention proposes to provide the candidate list of the operating channel that the AP is going to change afterward for the STA in order that the STA may effectively search the operating channel. In case that the STA which is provided with the candidates list of the operating channel is not able to receive the beacon frame from the AP since the operating channel of the AP is changed after long sleep time, the STA tries to receive the beacon frame from the AP in the corresponding channel by performing the scanning of the candidate operating channel first.

In case of using the candidate operating channel, more effective scanning operation may be performed in comparison with the case of scanning the overall channels without the order of priority. Through this, the STA may search the changed channel faster and more effectively in comparison with the case of not knowing the candidate operating channels and receive the beacon frame again from the AP through the changed channel.

The operating channel candidates that the AP provides for the STA may be transmitted through the Probe Response frame, the Association Response frame, the Beacon frame or a separate management frame.

Figure 4:
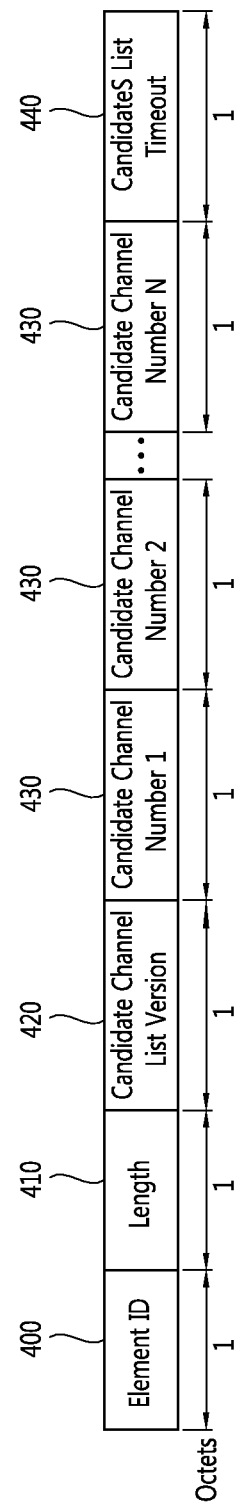
FIG. 4 is a conceptual diagram illustrating the channel switch candidate information element according to an embodiment of the present invention.

FIG. 4 is a conceptual diagram illustrating the channel switch candidate information element according to an embodiment of the present invention.

The channel switch candidate information element shown in FIG. 4 may include an element ID 400, a length 410, a candidate channel list version 420, a candidate channel number 430 and a candidate list timeout 440.

The candidate channel list version 420 may include the version information of the candidate channel list. The candidate channel list may be generated by being updated with the version information. The set of the candidate channel number included in the channel switch candidate information element may be changed as the candidate channel list version is updated.

As the method for utilizing the candidate channel list version 420, in case that the candidate channel number 430 of the channel switch candidate information element which is previously forwarded is identical to the candidate channel number 430 of the channel switch candidate information element which is currently forwarded, the method of forwarding the candidate channel list version 420 only, not forwarding the candidate channel number 430 may save the resource. In addition, it is also possible to transmit the channel switch candidate information element including the candidate channel list version 420 only except for the candidate channel number 430 by determining a predetermined period.

The candidate channel number 430 may indicate the channel number of the operating channel which is movable in case that the AP switches the operating channel. For example, assuming that the frequency bandwidth of 917 MHz to 923 MHz may be used in the sub 1 GHz range, there may exist 6 channels having the frequency bandwidth of 1 MHz each within the frequency bandwidth. Each of the 1 MHz channels may be indicated to channel #1 to channel #6. The candidate channel number 430 may be used for indicating the value of the channel to which the AP moves later (for example, channel #2 or channel #3).

The candidate list timeout 440 may include the information of the available interval (or valid duration) of the candidate channel number 430 included in the channel switch candidate information element. The available interval may be represented by using various time units such as the time unit, the unit of the beacon interval (i.e., the number of the TBTT) or the unit of the DTIM interval (i.e., the number of the DTIM).

A user equipment may obtain the information of how long the candidate channel list is valid which is received by the STA at the moment that receives the channel switch candidate information element by using the candidate list timeout 440.

The candidate list timeout 440 may be the value which is gradually decreased according to the timing that the AP forwards the channel switch candidate information element. For example, when forwarding the candidate channel list first, it may be transmitted with a predetermined value being set for the candidate list timeout 440, and the value of the candidate list time out 440 included in the frame to be transmitted later may be gradually decreased from the value previously set. In case that the value set as the candidate list timeout 440 diverges to 0, the new version of the candidate channel list version 420 and the candidate channel number 430 which corresponds to the candidate channel list version 420 may be transmitted to the channel switch candidate information element. Or, the channel switch candidate information element may be transmitted by reconfiguring the candidate list timeout 440.

For the method of channel switching according to an embodiment of the present invention, fast channel scanning may be performed even in case that the channel of the AP is changed when the STA of the long sleep interval being changed to the wakeup mode by transmitting the channel switch candidate information element, the information of the management frame including the information of the candidate channel which is to be switched. That is, the STA may perform faster connection with the AP than the case of not knowing the channel information to which the AP moves by preferentially searching at least one of the candidate channels which is included in the channel switch candidate information element received before entering into the sleep mode.

Figure 5:
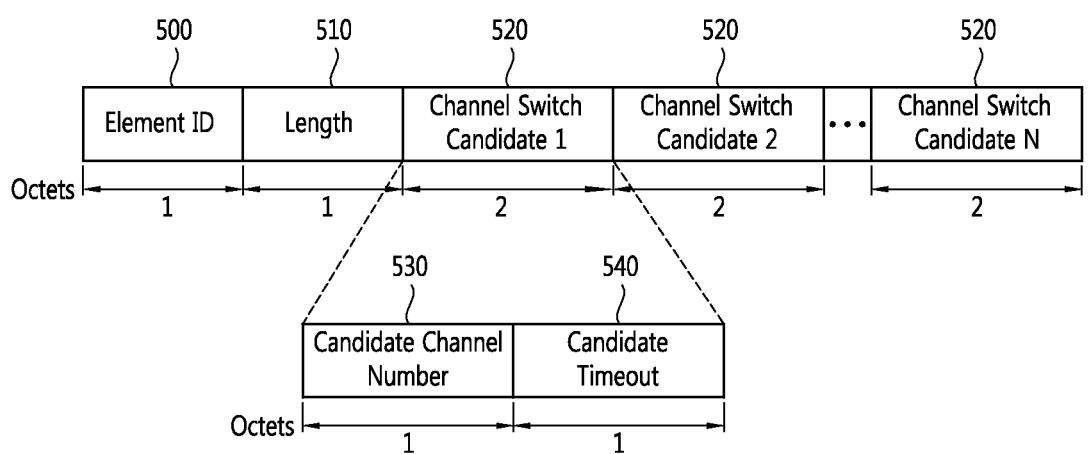
FIG. 5 is a conceptual diagram illustrating the channel switch candidate information element according to an embodiment of the present invention.

FIG. 5 is a conceptual diagram illustrating the channel switch candidate information element according to an embodiment of the present invention.

FIG. 5 represents the channel switch candidate information element whose configuration is different from that of FIG. 4.

Referring to FIG. 5, the channel switch candidate information element may include an element ID 500, a length 510 and a channel switch candidate 520.

Each of the channel switch candidate 520 may include a candidate channel number 530 and a candidate timeout 540.

The candidate channel number 530 may include the information indicating the channel candidate to which the AP may move later.

The candidate timeout 540 may be the information of the time that each of the candidate channel numbers 530 is valid. For example, the candidate timeout 540 may be represented with various time units such as the time unit, the unit of the beacon interval (i.e., the number of the TBTT) or the unit of the DTIM interval (i.e., the number of the DTIM).

In case of using the timeout by each candidate channel, the information of the channel that the timeout does not lapse may be individually acquired by the STA, and the candidate channel of which the timeout does not lapse may be utilized for channel scanning.

Figure 6:
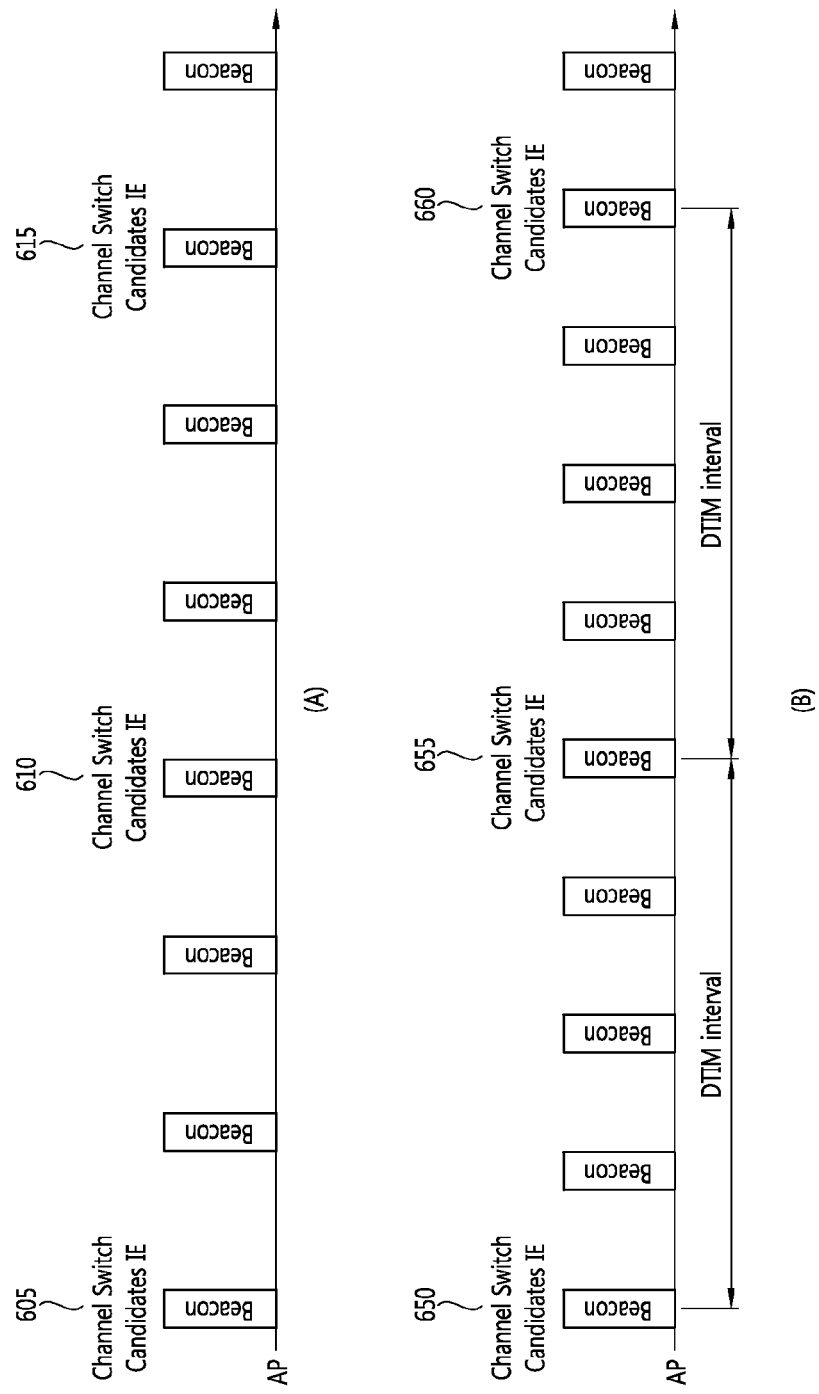
FIG. 6 is a conceptual diagram illustrating how the channel switch candidate information element is transmitted according to an embodiment of the present invention.

FIG. 6 is a conceptual diagram illustrating how the channel switch candidate information element is transmitted according to an embodiment of the present invention.

Although the case that channel switch candidate information element is transmitted with being included in the beacon frame is assumed and described with referring to FIG. 6, it is also possible that it is transmitted with being included in other management frame, not in the beacon frame, and the embodiment also falls into the scope of the right of the present invention.

Referring to FIG. 6 (A), the beacon frame may be transmitted with a predetermined interval by the AP. The channel switch candidate information element may be transmitted with being included in the beacon frames 605, 610 and 615 having a predetermined period when the beacon frame is transmitted.

For example, The period 605, 610 and 615 for which the 3 beacon frames are transmitted can be configured as a transmitting period of the channel switch candidate information element. The channel switch candidate information element may be transmitted in the corresponding period configured as above.

Referring to FIG. 6 (B), the channel switch candidate information element may be transmitted based on the interval at which the delivery traffic indication map (DTIM) is transmitted by the AP. In case that the beacon frame 650, 655 and 660 including the DTIM is transmitted with the channel switch candidate information element being included, since the probability of receiving by the STA is relatively high, the channel switch candidate information element may be effectively transmitted on the DTIM transmission period.

The periods described above are shown as an example, and the channel switch candidate information element may be transmitted from the management frame with a different period according to an embodiment of the present invention. In addition, the channel switch candidate information element may be transmitted in case that the STA requests the corresponding information as well as being transmitted in a predetermined interval, and the embodiment also falls into the scope of the right of the present invention. Hereinafter, the case that the STA requests the information relevant to the candidate channel will be described in FIG. 7

Figure 7:
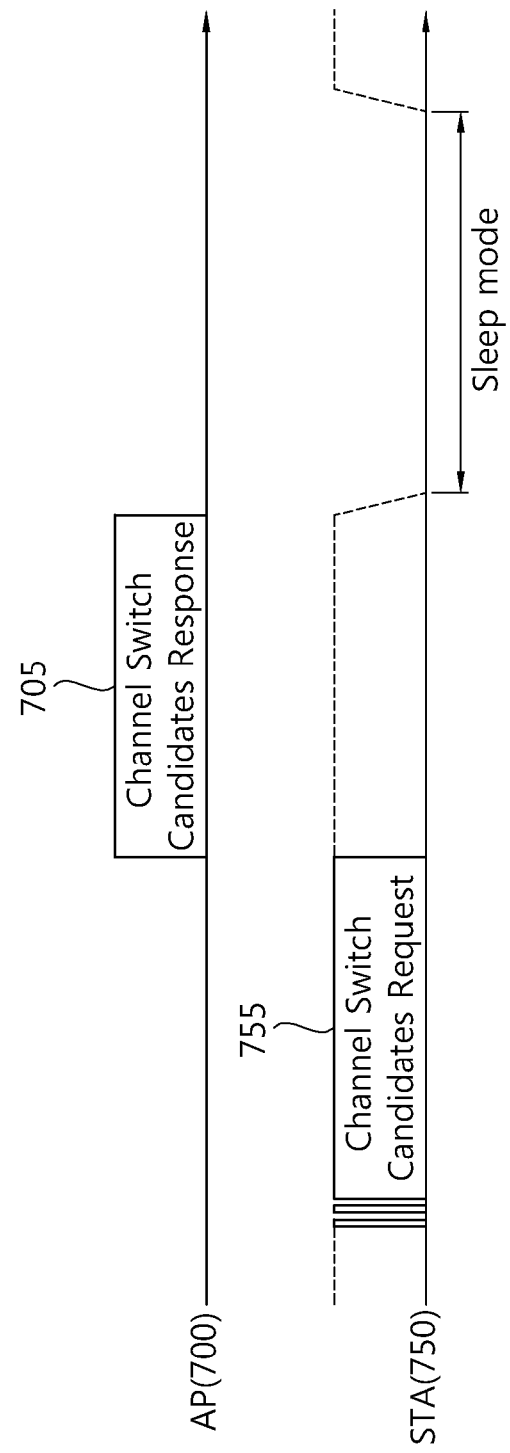
FIG. 7 is a conceptual diagram illustrating the method of the channel switch candidate information element being transmitted according to an embodiment of the present invention.

FIG. 7 is a conceptual diagram illustrating the method of the channel switch candidate information element being transmitted according to an embodiment of the present invention.

FIG. 7 is a conceptual diagram illustrating the case that the STA 750 requests the channel switch candidate information element.

Referring to FIG. 7, the STA 750 transmits the channel switch candidate request frame 755 to the AP 700.

The STA 750 may know the information of whether the STA 750 additionally updates the candidate channel list by transmitting the channel switch candidate request frame 755 to the AP 700, and may notify that it is not able to receive the frame including the channel switch candidate information element for a predetermined interval by transmitting the information of when its sleep mode is converted to be woken up to the AP 700.

Figure 8:
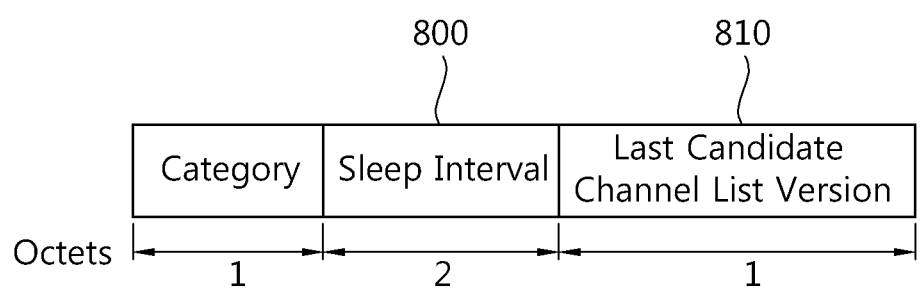
FIG. 8 is a conceptual diagram illustrating the channel switch candidate request frame format according to an embodiment of the present invention.

FIG. 8 is a conceptual diagram illustrating the channel switch candidate request frame format according to an embodiment of the present invention.

In FIG. 8, as the frame for requesting the channel switch candidate information element, the channel switch candidate request frame 755 may be used. As the frame format 755 for requesting the channel switch candidate information element is not an independent frame format, it is able to be transmitted including the field described below as an information element of the existing management frame, and the embodiment also falls into the scope of the right of the present invention.

The channel switch candidate request frame 755 may include a sleep interval 800 and a last candidate channel list version 810.

The sleep interval 800 may include the information of the interval during which the STA 750 that transmits the channel candidate request frame operates in sleep mode. The AP 700 may acquire the information of the interval during which the STA 750 operates in sleep mode based on the transmitted sleep interval 800.

Since the STA 750 is not able to receive a frame at the interval during which the STA 750 operates in sleep mode, the STA 750 is not able to receive the information of the alteration operation channel and that of the candidate channel which is transmitted from the AP 700 at the interval of operating in sleep mode.

The AP 700 may transmit the information of whether the operation channel of the AP 700 is changed when the STA 750 operates in the awake mode by being converted from the sleep mode later based on the sleep interval which is transmitted from the STA 750, and the channel information which can be utilized for the candidate channel in the AP 700.

The last candidate channel list version 810 may be the information of the candidate channel which is currently received by the STA 750. Like the example of FIG. 4 described above, the AP 700 may transmit the candidate channel list with a certain version information, and transmit the updated candidate channel list by updating the version information.

The STA 750 may transmit the candidate channel list which is recently acquired with being included in the last candidate channel list version 810. By using the method, in case that the candidate channel list information which is currently transmitted by the AP 700 and the candidate channel list information which is stored in the STA 750 are different, the AP 700 may transmit the candidate channel list information updated with being included in the channel candidate response frame 705.

In case that the candidate channel list information which is currently transmitted by the AP 700 and the candidate channel list information which is stored in the STA 750 are identical, the AP 700 may not transmit the updated candidate channel list information when transmitting the channel candidate response frame 705.

Referring to FIG. 7 again, the AP 700 transmits the channel switching candidate response frame 705 to the STA 750.

The channel switching candidate response frame 705 may be used for the frame by which the current candidate channel list information of the AP 700 is transmitted to the STA 750.

Figure 9:
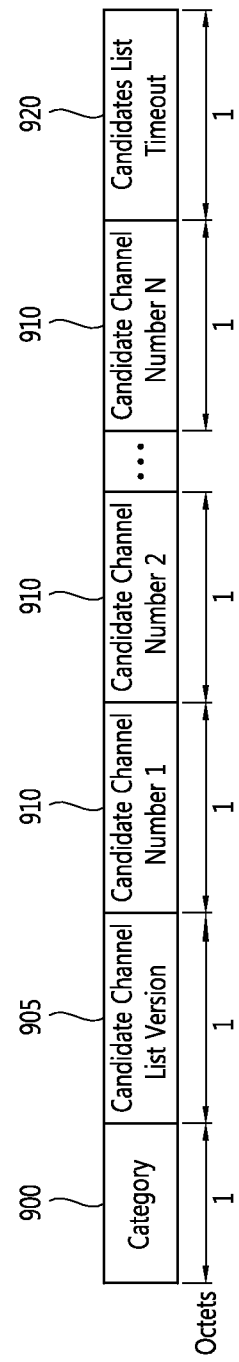
FIG. 9 is a conceptual diagram illustrating the channel switch candidate response frame according to an embodiment of the present invention.

FIG. 9 is a conceptual diagram illustrating the channel switch candidate response frame according to an embodiment of the present invention.

Referring to FIG. 9, the channel switch candidate response frame may include a category 900, a candidate channel list version 905, a candidate channel number 910 and a candidate list timeout 920.

The category 900 may be used for indicating that current frame is the channel switch candidate response frame.

The candidate channel list version 905 may include the version information of the candidate channel list. The candidate channel list may be generated by being updated having the predetermined version information. As the candidate channel list version being updated, the set of the candidate channel numbers which is included in the channel switch candidate information element may be changed.

In case the last candidate channel list version 810 included in the channel switch candidate request frame 755 which is transmitted from the STA 750 by using the candidate channel list version 905 is identical to the candidate channel list version 905 which is transmitted from the AP 700, the candidate channel list version 905 may not be separately transmitted.

The candidate channel number 910 may indicate the channel number of the operating channel to which the AP 700 may move when the operating channel is switched. The candidate channel number may include the information of the channels which are included in the recent candidate channel list version.

In case that the last candidate channel list version 810 included in the channel switch candidate request frame which is transmitted from the STA 750 is identical to the candidate channel list version of the channel switch candidate response frame 705 which is transmitted from the AP 700, the channel switch candidate response frame 705 may be transmitted without including the candidate channel number 910.

The candidate list timeout 920 may include the information of how long the candidate channel list included is valid. The valid term may be represented as various time units such as the time unit, the unit of the beacon interval (i.e., the number of the TBTT) or the unit of the DTIM interval (i.e., the number of the DTIM).

The candidate list timeout information 920 also may not be transmitted if the candidate channel list information which is received by the STA 750 is identical to the candidate channel list information which is transmitted from the AP 750.

The channel switch candidate request frame 755 may have various frame format as well as the format of FIG. 7, and the channel switch candidate response frame 705 may also have various frame formats as well as the format of FIG. 9.

Figure 10:
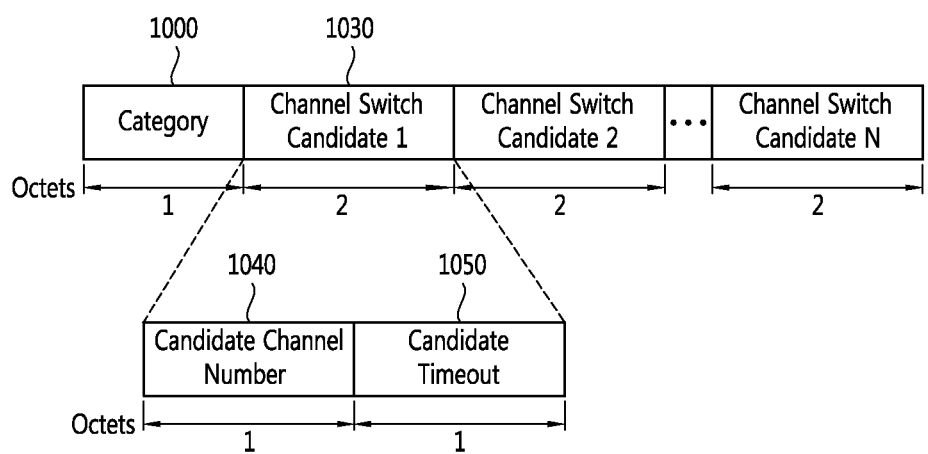
FIG. 10 is a conceptual diagram illustrating the channel switch candidate response frame according to an embodiment of the present invention.

FIG. 10 is a conceptual diagram illustrating the channel switch candidate response frame according to an embodiment of the present invention.

Referring to FIG. 10, the channel switch candidate response frame may have a category 1000 and a channel switch candidate 1030.

The category 1000 may be used for indicating that the current frame is the channel switch candidate response frame.

The channel switch candidate 1030 may include a candidate channel number 1040 and a timeout value 1050 that corresponds to the candidate channel number.

The candidate channel number 1040 may include the information that indicates the channel candidate to which the AP may move later.

The candidate timeout 1050 may be the information how long the candidate channel number is valid. For example, the candidate timeout 1050 may be represented as various time units such as the time unit, the unit of the beacon interval (i.e., the number of the TBTT) or the unit of the DTIM interval (i.e., the number of the DTIM).

In case that the timeout is used for each candidate channel, the STA may individually acquire the information of the channel that the timeout is not lapsed and use the information for channel scanning of the candidate channel that the timeout is not lapsed.

As described above, the AP may not transmit the channel switch candidate information if the recent candidate channel list information which is transmitted from the STA is identical to the value stored in the AP.

The method that the channel switch candidate information element is transmitted according to an embodiment of the present invention may be simply used for the purpose of requesting the channel switch candidate without including the sleep interval information or the last candidate channel list version information. In this case, the channel switch candidate request frame may be transmitted being included in the channel switch candidate request frame in the information of the candidate channel list or the information of the candidate channel list version which is stored in the STA except the sleep interval field, and the AP may determine whether the candidate channel list information which is transmitted from the STA and the candidate channel list information which is currently transmitted are identical. As the result of the determination of the AP, if the candidate channel list information and the candidate channel list information which is currently transmitted are identical, the channel switch candidate response frame including the ACK frame or the information that the STA does not necessary to update the candidate channel list may be transmitted. As the result of the determination of the AP, if the candidate channel list information and the candidate channel list information which is currently transmitted are not identical, the channel switch candidate response frame including the candidate channel list information which is newly updated may be transmitted to the STA.

Figure 11:
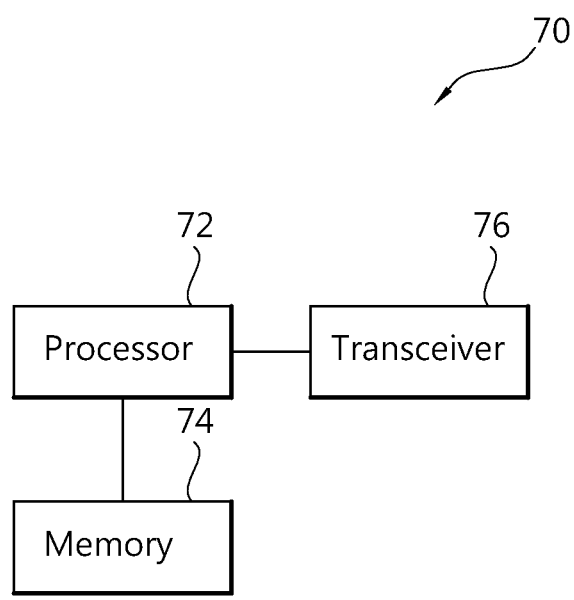
FIG. 11 is a block diagram illustrating the wireless apparatus that an embodiment of the present invention can be implemented.

FIG. 11 is a block diagram illustrating the wireless apparatus that an embodiment of the present invention can be implemented.

The wireless apparatus 70 is the user equipment that the above described embodiment can be implemented, may be an AP or non-AP station (STA).

The wireless apparatus 70 includes a processor 72, a memory 74 and a transceiver 76. The transceiver 76 receives/transmits a radio signal, where the physical layer of IEEE 802.11 is implemented. The processor 72 may implement the MAC layer and the physical layer of IEEE 802.11 with being functionally connected with the transceiver. The processor 72 may be implemented to perform the method of transmitting the operation channel switching information according to an embodiment of the present invention with referring to FIG. 3 to FIG. 10. For example, the processor may be implemented to preferentially scan the candidate operation channel induced based on the channel switch candidate information, if the operation channel is changed based on the candidate channel frame which is received. That is, the processor 72 may be implemented to pursuit the embodiments of the present invention described above.

The processor 72 and/or the transceiver 76 may include an application-specific integrated circuit (ASIC), a separate chipset, a logic circuit, and/or a data processing unit. The memory 74 may include a read-only memory (ROM), a random access memory (RAM), a flash memory, a memory card, storage medium, and/or other equivalent storage devices. When the embodiment of the present invention is implemented in software, the aforementioned methods can be implemented with a module (i.e., process, function, etc.) for performing the aforementioned functions. The module may be stored in the memory 74 and may be performed by the processor 72. The memory 74 may be located inside or outside the processor 72, and may be coupled to the processor 72 by using various well-known means.

What is claimed is:

1. A method for transmitting information on a switching of an operating channel, the method comprising:
   receiving a candidate channel frame including channel switch candidate information through the operating channel; and
   preferentially scanning a candidate operation channel induced based on the channel switch candidate information if the operating channel is changed,
   wherein the candidate operation channel is a channel having a possibility of being preferentially selected as a changed operating channel if the operating channel is changed to another channel.

2. The method of claim 1, wherein the channel switch candidate information further includes:
   candidate operation channel list version information for indicating the candidate channel set that includes at least one of the candidate operation channels; and
   candidate timeout information that corresponds to information on a valid duration of the candidate operation channel included in the candidate channel set.

3. The method of claim 2, further comprising transmitting a candidate channel request frame including channel switch candidate request information for acquiring information on the candidate operation channel,
   wherein the channel switch candidate request information includes sleep interval information and candidate operation channel list version information which is recently received.

4. The method of claim 3, wherein the candidate channel request frame is transmitted in wake up mode by considering the sleep interval information.

5. The method of claim 1, wherein the channel switch candidate information further includes candidate timeout information that corresponds to information on a valid duration of the candidate operation channel included in the candidate channel set.

6. The method of claim 1, wherein the candidate channel frame is periodically transmitted.

7. A station that receives information on a switching of an operating channel, the station comprising a process and a transceiver,
- wherein the transceiver is implemented to receive a candidate channel frame including channel switch candidate information through the operating channel,
- wherein the process is implemented to preferentially scan a candidate operation channel induced based on the channel switch candidate information if the operating channel is changed based on the candidate channel frame received, and
- wherein the candidate operation channel is a channel having a possibility of being preferentially selected as a changed operating channel if the operating channel is changed to other channel.

8. The station of claim 7, wherein the channel switch candidate information further includes:
- candidate operation channel list version information for indicating the candidate channel set that includes at least one of the candidate operation channels; and
- candidate timeout information that corresponds to information on a valid duration of the candidate operation channel included in the candidate channel set.

9. The station of claim 8,
- wherein the process is implemented to generate a candidate channel request frame including channel switch candidate request information for acquiring information of the candidate operation channel,
- wherein the transceiver transmits the candidate channel request frame, and
- wherein the channel switch candidate request information includes sleep interval information and candidate operation channel list version information which is recently received.

10. The station of claim 9, wherein the candidate channel request frame is transmitted in wake up mode by considering the sleep interval information.

11. The method of claim 7, wherein the channel switch candidate information further includes
- candidate timeout information that corresponds to information on a valid duration of the candidate operation channel included in the candidate channel set.

12. The method of claim 7, wherein the candidate channel frame is periodically transmitted.

* * * * *